US 10,208,802 B2
(12) United States Patent
Kato

(10) Patent No.: US 10,208,802 B2
(45) Date of Patent: Feb. 19, 2019

(54) SEALING DEVICE

(71) Applicant: NOK CORPORATION, Tokyo (JP)

(72) Inventor: Takuya Kato, Fukushima (JP)

(73) Assignee: NOK CORPORATION (JP)

(*) Notice: Subject to any disclaimer, the term of this patent is extended or adjusted under 35 U.S.C. 154(b) by 0 days.

(21) Appl. No.: 15/735,332

(22) PCT Filed: Jun. 10, 2016

(86) PCT No.: PCT/JP2016/067311
§ 371 (c)(1),
(2) Date: Dec. 11, 2017

(87) PCT Pub. No.: WO2016/199881
PCT Pub. Date: Dec. 15, 2016

(65) Prior Publication Data
US 2018/0172077 A1 Jun. 21, 2018

(30) Foreign Application Priority Data

Jun. 12, 2015 (JP) ................................. 2015-119032

(51) Int. Cl.
F16C 33/80 (2006.01)
F16J 15/3232 (2016.01)
(Continued)

(52) U.S. Cl.
CPC ............ *F16C 33/805* (2013.01); *F16C 19/06* (2013.01); *F16C 33/7879* (2013.01);
(Continued)

(58) Field of Classification Search
CPC ............ B60B 27/0073; F16C 33/7879; F16C 33/7883; F16C 33/80; F16C 33/805; F16C 2326/02
See application file for complete search history.

(56) References Cited

U.S. PATENT DOCUMENTS 5,944,321 A 8/1999 Niebling et al.
8,167,500 B2 * 5/2012 Furukawa ............. F16C 19/386
277/345
(Continued)

FOREIGN PATENT DOCUMENTS

CN 103210224 A 7/2013
CN 104329380 A 2/2015
(Continued)

OTHER PUBLICATIONS

Extended European Search Report for EP Application No. 16807586.9, dated Jun. 4, 2018 (9 pages).

Primary Examiner — Phillip A Johnson
(74) Attorney, Agent, or Firm — Harness, Dickey & Pierce, P.L.C.

(57) ABSTRACT

A sealing device is constructed by combination of a lip seal member attached to a not-rotating stationary member and a seal flange member attached to a rotary member. The seal lip member has a lip seal member main body having an end face lip, an outward flange portion, and an outer peripheral tube portion. The seal flange member has a seal flange member main body and an outer peripheral side tubular portion. The sealing device further includes a non-contact type labyrinth seal having a predetermined axial length arranged between the outer peripheral tube portion in the lip seal member and the outer peripheral side tubular portion in the seal flange member. The sealing device can improve sealing performance, particularly muddy water sealing performance, while fulfilling the need for low torque.

5 Claims, 3 Drawing Sheets

(51) Int. Cl.
*F16J 15/447* (2006.01)
*F16C 33/78* (2006.01)
*F16J 15/3264* (2016.01)
*F16J 15/3268* (2016.01)
*F16C 19/06* (2006.01)
*F16C 19/18* (2006.01)

(52) U.S. Cl.
CPC ....... *F16J 15/3232* (2013.01); *F16J 15/3264* (2013.01); *F16J 15/3268* (2013.01); *F16J 15/447* (2013.01); *F16C 19/186* (2013.01)

(56) References Cited

U.S. PATENT DOCUMENTS

| | | | |
|---|---|---|---|
| 8,573,601 B2 * | 11/2013 | Nakagawa | F16J 15/3264 277/551 |
| 2008/0031556 A1 | 2/2008 | Heim et al. | |
| 2013/0241270 A1 | 9/2013 | Morita | |
| 2015/0003766 A1 | 1/2015 | Duch et al. | |
| 2015/0110432 A1 | 4/2015 | Wakisaka et al. | |
| 2015/0151574 A1 * | 6/2015 | Barberis | F16C 33/783 384/486 |

FOREIGN PATENT DOCUMENTS

| | | | | |
|---|---|---|---|---|
| CN | 104565081 A | | 4/2015 | |
| EP | 2868938 A1 | | 5/2015 | |
| JP | 58-002695 A | | 1/1983 | |
| JP | 2008-095919 A | | 4/2008 | |
| JP | 2010-048346 A | | 3/2010 | |
| JP | 2012-081891 A | | 4/2012 | |
| JP | 2014020413 A | * | 2/2014 | .......... F16C 33/7879 |
| JP | 2014-101897 A | | 6/2014 | |
| JP | 2014-126105 A | | 7/2014 | |
| JP | 2014-173677 A | | 9/2014 | |
| JP | 2014240676 A | * | 12/2014 | .......... F16C 33/7876 |
| JP | 2015-064054 A | | 4/2015 | |
| KR | 10-2013-0087855 | | 8/2013 | |
| KR | 10-2014-0005546 A | | 1/2014 | |
| KR | 10-1509165 B1 | | 4/2015 | |

* cited by examiner

PRIOR ART

SEALING DEVICE

CROSS-REFERENCE TO RELATED APPLICATIONS

This application is a U.S. National Stage Application of International Application No. PCT/JP2016/067311, filed on Jun. 10, 2016, and published in Japanese as WO 2016/199881 A1 on Dec. 15, 2016 and claims priority to Japanese Patent Application No. 2015-119032, filed on Jun. 12, 2015. The entire disclosures of the above applications are incorporated herein by reference.

BACKGROUND OF THE INVENTION

Field of the Invention

The present invention relates to a sealing device according to a seal technique. The sealing device according to the present invention is used, for example, as a hub bearing seal for a vehicle such as a motor vehicle or the other bearing seals.

DESCRIPTION OF THE CONVENTIONAL ART

Conventionally, there has been known a sealing device 51 sealing in such a manner as to prevent foreign material in a machine outside O from entering into a machine inside I, in which the sealing device 51 is provided with a lip seal member 52 which is attached to a not-rotating stationary member 61, and an end face lip 53 provided in the lip seal member 52 is slidably brought into contact with an end face portion 72 of a rotary member 71, as shown in FIG. 3. The sealing device 51 is used as a hub bearing seal for a vehicle such as a motor vehicle.

In recent years, this kind of hub bearing seal has been frequently used in a place which is severe in a muddy water condition. As a result, improvement of a muddy water sealing performance is demanded. However, since there is also a request for a low torque in the light of improvement of a fuel consumption, it should be avoided to improve the muddy water sealing performance by increasing the number of the end face lip 53.

The present invention is made by taking the above point into consideration, and an object of the present invention is to provide a sealing device which can improve a sealing performance, particularly a muddy water sealing performance while responding to the request for the low torque.

SUMMARY OF THE INVENTION

In order to achieve the object mentioned above, the present invention employs the following means.

More specifically, a sealing device according to the present invention is constructed by combination of a lip seal member which is attached to a not-rotating stationary member, and a seal flange member which is attached to a rotary member, the seal lip member is provided with a lip seal member main body which has an end face lip slidably coming into contact with an end face of the seal flange member and is assembled in an inner peripheral side of the stationary member, an outward flange portion which is integrally formed in an outer peripheral side of the lip seal member main body and is arranged so as to be opposed to the end face of the stationary member, and an outer peripheral tube portion which is integrally formed in an outer peripheral side of the outward flange portion, is arranged in an outer peripheral side of the stationary member and is formed into a tubular shape, the seal flange member is provided with a seal flange member main body with which the end face lip slidably comes into contact, and an outer peripheral side tubular portion which is integrally formed in an outer peripheral side of the seal flange member main body and is arranged in further an outer peripheral side of the outer peripheral tube portion in the lip seal member in a non-contact manner, and a non-contact type labyrinth seal having a predetermined axial length is arranged between the outer peripheral tube portion in the lip seal member and the outer peripheral side tubular portion in the seal flange member.

In the sealing device having the structure mentioned above, a contact type seal portion caused by a sliding motion of the end face lip is set, and the non-contact type labyrinth seal constructed by the combination of the outer peripheral tube portion in the lip seal member and the outer peripheral side tubular portion in the seal flange member is set in the outer peripheral side thereof (in a machine outside). The outer peripheral tube portion in the lip seal member and the outer peripheral side tubular portion in the seal flange member are both formed into a tubular shape, and an opening of a gap formed between both the elements is directed to one side in an axial direction in place of an outer side in a radial direction. As a result, external foreign material such as muddy water is hard to enter thereinto. Further, since the length in the axial direction of the gap formed between both the elements can be optionally set, the labyrinth seal can be set to be a labyrinth seal having a long gap. As a result, it is possible to improve the sealing performance achieved by the labyrinth seal. Therefore, it is possible to fulfil the request for the low torque since the number of the end face lip is not increased. Further, it is possible to provide the sealing device which can achieve an excellent sealing performance on the basis of the combination of the contact type seal portion and the non-contact type labyrinth seal.

The seal flange member attached to the rotary member may be constructed by integrally forming a seal flange member main body and an outer peripheral side tubular portion with a stainless steel plate. In the case that the end face lip directly comes into slidable contact with the rotary member in place of the seal flange member, rust tends to be generated in the rotary member by influence of the muddy water or salt water since the rotary member is frequently manufactured by bearing steels. As a result, there is fear that the contact of the end face lip becomes unstable, thereby running to leakage. On the contrary, since the rust is hard to be generated in the case that the seal flange member is made of the stainless steel plate, the contact of the end face lip can be stabilized.

As mentioned above, according to the present invention, the non-contact type labyrinth seal is set on the basis of the combination of the outer peripheral tube portion in the lip seal member and the outer peripheral side tubular portion in the seal flange member. In addition to this, in the case that a labyrinth lip opposed to the seal flange member main body in a non-contact manner is provided in the outward flange portion in the lip seal member, it is possible to further improve a sealing effect achieved by the non-contact type labyrinth seal. Further, since the muddy water flows down along the outer peripheral surface of the labyrinth lip in a circumferential direction, it is possible to improve the sealing effect.

The outer peripheral tube portion in the lip seal member is assembled in the outer peripheral surface of the stationary member when the lip seal member is attached to the not-rotating stationary member. In the case that the outer peripheral tube portion does not have any core bar but is constructed only by a rubber-like elastic body, there is fear that the outer peripheral tube portion is deformed at the assembling time and curling is generated. In order to devise a countermeasure of this, a chamfer shape suppressing deformation at the assembling time is preferably provided in an inner peripheral surface of a leading end portion of the outer peripheral tube portion which is made of the rubber-like elastic body. According to this structure, since an inner diameter of the leading end portion of the outer peripheral tube portion is substantially expanded by the chamfer shape, it is possible to inhibit the outer peripheral tube portion from being deformed at the assembling time.

In the case that a lot of sealing devices are manufactured and stocked or carried, the sealing devices are concentrically stacked in a state in which a plurality of seal flange members are set to a fixed direction. In this case, the plural stacked seal flange members do not generate collapse of cargo piles as long as a structure for positioning a plurality of seal flange members each other is provided. Therefore, the seal flange member is preferably provided with positioning structures for each other. The positioning structure is specifically provided by a step shape which is formed in an outer surface of a bent portion between the seal flange member main body and the outer peripheral side tubular portion. A leading end of the outer peripheral side tubular portion in the adjacent seal flange member engages with the step shape. As a result, it is possible to inhibit the collapse of cargo piles from being generated.

The sealing device according to the present invention is used, for example, as a hub bearing seal for a vehicle such as a motor vehicle, or the other bearing seals. Therefore, the effects according to the present invention can be achieved and acquired in the sealing devices in these technical fields.

Effect of the Invention

According to the present invention, it is possible to improve the sealing performance, particularly the muddy water sealing performance while fulfilling the request for the low torque on the basis of the above structure.

DETAILED DESCRIPTION OF PREFERRED EMBODIMENTS

Next, a description will be given of an embodiment according to the present invention with reference to the accompanying drawings.

Figure 1:
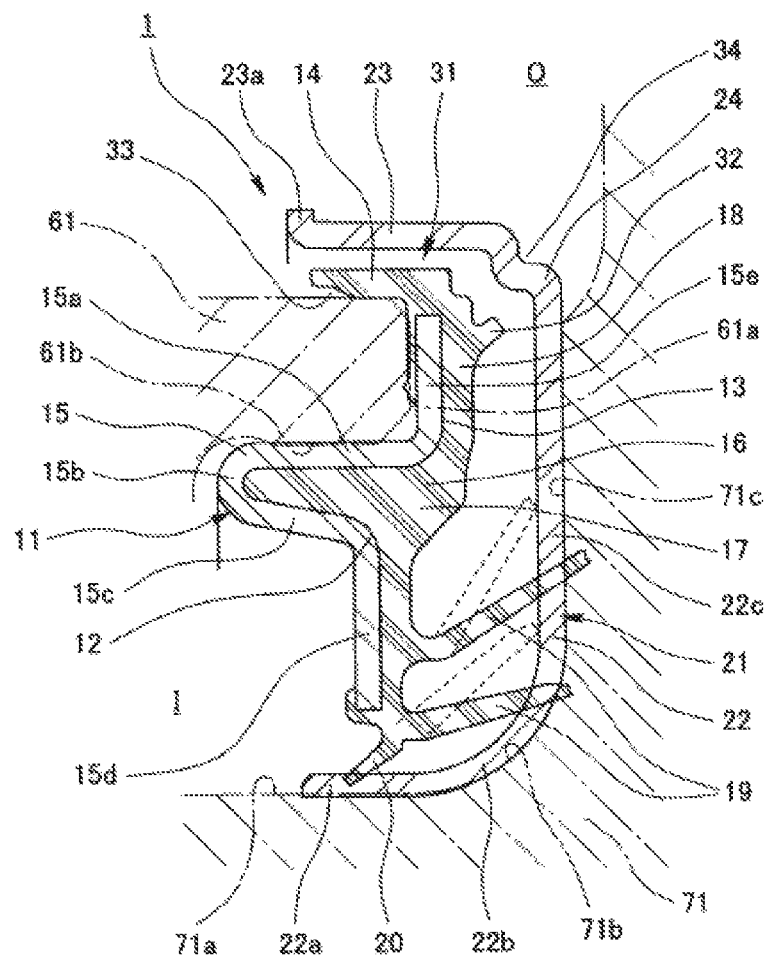
FIG. 1 is a cross sectional view of a substantial part of a sealing device according to an embodiment of the present invention.

FIG. 1 shows a cross section of a substantial part of a sealing device 1 according to an embodiment of the present invention.

The sealing device 1 according to the embodiment is used as a hub bearing seal (a hub seal) in a bearing portion in a wheel suspension device for a motor vehicle, inhibits external foreign material (disturbance factor) such as water, muddy water, salt water, dust, brake fluid or oil in a bearing external portion (a machine outside) O from entering into a bearing internal portion (a machine inside) I, and inhibits lubricating grease in the bearing internal portion I from leaking out to the bearing external portion O.

The sealing device 1 is constructed by combination of a lip seal member 11 which is attached to a not-rotating stationary member (a bearing outer ring) 61, and a seal flange member 21 which is attached to a rotary member (a rotary shaft) 71.

The lip seal member 11 is integrally provided with a lip seal member main body (a lip seal inner peripheral portion) 12 which has an end face lip 19 slidably coming into contact with an end face portion 22c of the seal flange member 21 and is assembled in an inner peripheral side of the stationary member 61, an outward flange portion (a lip seal end face portion) 13 which is integrally formed in an outer peripheral side of the lip seal member main body 12 and is arranged so as to be opposed to the end face 61a of the stationary member 61, and a tubular outer peripheral tube portion (a lip seal outer peripheral portion) 14 which is integrally formed further in an outer peripheral side of the outward flange portion 13, is arranged in an outer peripheral side of the stationary member 61 and is formed into a tubular shape.

Further, the lip seal member 11 is provided with a metal ring (a core bar) 15 and a rubber-like elastic body 16 which is attached (crosslinked and bonded) to the metal ring, as components thereof.

The metal ring 15 is provided with a tubular portion 15a which is fitted to an inner peripheral surface 61b of the stationary member 61, and is structured such that a radially inward flange portion 15d is integrally formed in one end portion of the tubular portion 15a in an axial direction via an inverting portion 15b and an inner peripheral tube portion 15c, and a radially outward flange portion 15e is integrally formed in the other end portion of the tubular portion 15a in the axial direction.

The rubber-like elastic body 16 is integrally provided with an inner peripheral attached portion 17 which is attached to the tubular portion 15a, the inverting portion 15b, the inner peripheral tube portion 15c and the inward flange portion 15d of the metal ring 15, an end face attached portion 18 which is attached to the outward flange portion 15e of the metal ring 15, and the outer peripheral tube portion 14, and is structured such that two end face lips 19 are integrally formed in the inner peripheral attached portion 17 and one grease lip 20 is integrally formed therein.

On the other hand, the seal flange member 21 is constructed by one metal ring member. More specifically, the seal flange member 21 is provided with seal flange member main body 22 constructed by a tubular portion 22a which is fitted to an outer peripheral surface 71a of a rotary member 71, a round portion 22b which is arranged along a round surface 71b of the rotary member 71 and is formed into a circular arc cross sectional shape, and an end face portion 22c which is arranged along an end face 71c of the rotary member 71, and is structured such that an outer peripheral side tubular portion 23 is integrally formed from an outer peripheral end portion of the seal flange member main body 22 toward one side in the axial direction, the outer peripheral side tubular portion 23 being arranged in a non-contact manner further in an outer peripheral side of the outer peripheral tube portion 14 in the lip seal member 11. The seal flange member 21 is formed by a stainless steel (SUS) plate.

The outer peripheral tube portion 14 in the lip seal member 11 and the outer peripheral side tubular portion 23 in the seal flange member 21 which is arranged in the outer peripheral side thereof in a non-contact manner set a non-contact type labyrinth seal 31 having a predetermined axial length between them.

A labyrinth lip 32 opposed to the seal flange member main body 22 in a non-contact manner is provided in the outward flange portion 13 in the lip seal member 11.

The outer peripheral tube portion 14 in the lip seal member 11 is formed only by a rubber-like elastic body 16 without having a metal ring 15 built-in, and a chamfer shape 33 suppressing deformation at the assembling time is provided in an inner peripheral surface of a leading end portion of the outer peripheral tube portion 14.

Further, a step shape 34 is provided in an outer surface of a bent portion 24 between the seal flange member main body 22 and the outer peripheral side tubular portion 23 in the seal flange member 21, the step shape with which a leading end 23a of the outer peripheral side tubular portion 23 in the adjacent seal flange member 21 engages when a plurality of seal flange members 21 are stacked.

In the sealing device 1 having the structure mentioned above, the contact type seal portion on the basis of the sliding motion of the end face lip 19 is set, and the non-contact type labyrinth seal 31 is set in the outer peripheral side thereof (the machine outside O side). The non-contact type labyrinth seal is constructed by the combination of the outer peripheral tube portion 14 in the lip seal member 11 and the outer peripheral side tubular portion 23 in the seal flange member 21. Since the outer peripheral tube portion 14 in the lip seal member 11 and the outer peripheral side tubular portion 23 in the seal flange member 21 are both formed into the tubular shape, and the gap formed between both the portions 14 and 23 is open toward one side in the axial direction in place of the outer side in the radial direction, the external foreign material such as the muddy water is hard to enter from the machine outside O side. Further, since the gap formed between both the portions 14 and 23 is set its axial length to an optional magnitude, the labyrinth seal 31 is set to be long in its gap length. Therefore, since the labyrinth seal 31 having the structure mentioned above is arranged in the outer peripheral side of the contact type seal portion on the basis of the end face lip 19, an excellent sealing performance can be achieved by the sealing device 1. Further, since the sealing device 1 does not increase the number of the end face lip 19 in comparison with conventional one, the sealing device 1 can fulfil the request for the low torque. Therefore, it is possible to provide the sealing device which can fulfill the request for the low torque of the sliding portion as initially intended in the present invention, and can achieve the excellent sealing performance on the basis of the combination of the contact type sealing portion and the non-contact type labyrinth seal.

Further, since the seal flange member 21 is formed by the stainless steel plate, the rust is hard to be generated under material characteristics. Therefore, it is possible to prevent the rust from being generated in the other with which the end face lip 19 comes into contact, and it is possible to prevent the contact state of the end face lip 19 from being unstable.

Further, since the labyrinth lip 32 is provided so as to be positioned in the machine inside side of the labyrinth seal 31, the sealing effect on the basis of the non-contact type labyrinth seal is enlarged.

Further, the muddy water passing through the labyrinth seal 31 directly reaches the end face lip 19 if the labyrinth lip 32 is not provided. However, since the labyrinth lip 32 is provided, the labyrinth lip 32 receives the muddy water passing through the labyrinth seal 31. The muddy water runs off downward along the outer peripheral surface of the labyrinth lip 32 in a circumferential direction. Therefore, it is possible to improve the sealing effect on the basis of the receiving action of the labyrinth lip 32 as mentioned above.

Further, since the chamfer shape 33 suppressing the deformation at the assembling time is provided in the inner peripheral surface of the leading end portion of the outer peripheral tube portion 14 which is made of the rubber-like elastic body, it is possible to prevent the curling from being generated by the deformation of the outer peripheral tube portion 14.

Figure 2:
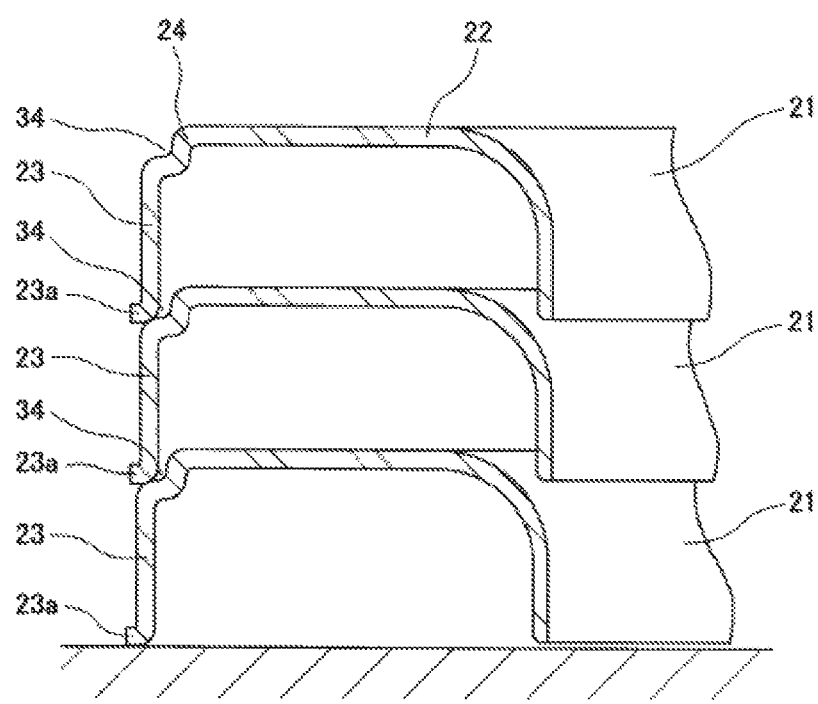
FIG. 2 is an explanatory view of a state in which a plurality of seal flange members in the sealing device are stacked.
Figure 3:
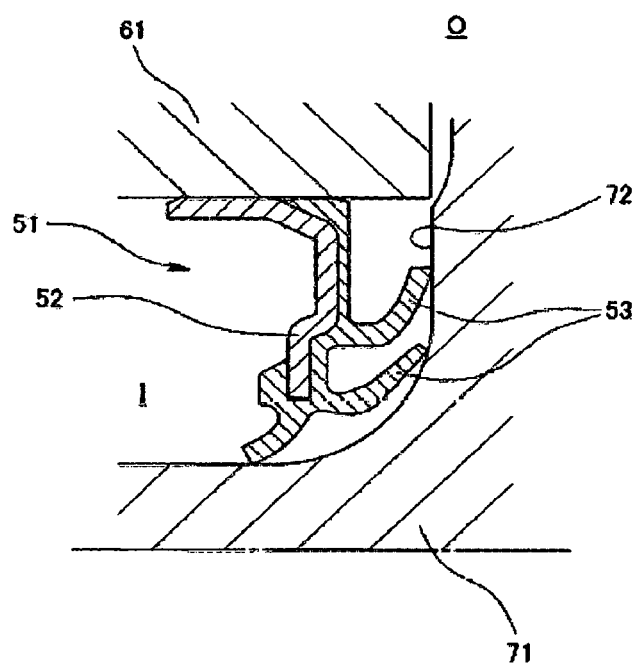
FIG. 3 is a cross sectional view of a substantial part of a sealing device according to a conventional art.

Further, since the step shape 34 is provided in the outer surface of the bent portion 24 between the seal flange member main body 22 and the outer peripheral side tubular portion 23, as shown in FIG. 2, the leading end 23a of the outer peripheral side tubular portion 23 in the upward seal flange member 21 engages with the step shape 34 when a plurality of seal flange members 21 are stacked, and the seal flange members 21 are positioned each other. Therefore, it is possible to prevent the collapse of cargo piles from being generated.

What is claimed is:

1. A sealing device comprising:
    a lip seal member which is attached to a not-rotating stationary member;
    a seal flange member which is attached to a rotary member;
    the lip seal member and the seal flange being combined;
    the lip seal member comprising:
        a lip seal member main body which has an end face lip slidably contacting an end face of the seal flange member and is assembled in an inner peripheral side of the stationary member;
        an outward flange portion which is integrally formed in an outer peripheral side of the lip seal member main body and is arranged so as to be opposed to the end face of the stationary member; and
        an outer peripheral tube portion which is integrally formed in an outer peripheral side of the outward flange portion, is arranged in an outer peripheral side of the stationary member and is formed into a tubular shape;
    the seal flange member comprising:
        a seal flange member main body with which the end face lip slidably contacts; and
        an outer peripheral side tubular portion which is integrally formed in an outer peripheral side of the seal flange member main body and is arranged further to an outer peripheral side of the outer peripheral tube portion in the lip seal member in a non-contact manner; and
    a non-contact type labyrinth seal having a predetermined axial length is arranged between the outer peripheral tube portion in the lip seal member and the outer peripheral side tubular portion in the seal flange member.

2. The sealing device according to claim 1, wherein the seal flange member is constructed by integrally forming the seal flange member main body and the outer peripheral side tubular portion with a stainless steel plate.

3. The sealing device according to claim 1, wherein a labyrinth lip opposed to the seal flange member main body in a non-contact manner is provided in the outward flange portion in the lip seal member.

4. The sealing device according to claim 1, wherein the outer peripheral tube portion in the lip seal member is formed by an elastic body, and a chamfer shape suppressing deformation at the assembling time is provided in an inner peripheral surface of a leading end portion of the outer peripheral tube portion.

5. The sealing device according to claim 1, wherein the sealing device is used as a bearing seal for a vehicle.

* * * * *